(12) United States Patent
Shaheen

(10) Patent No.: US 7,239,880 B2
(45) Date of Patent: Jul. 3, 2007

(54) METHOD AND APPARATUS FOR DELIVERING MULTIMEDIA MULTICAST SERVICES OVER WIRELESS COMMUNICATION SYSTEMS

(75) Inventor: Kamel M. Shaheen, King of Prussia, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 403 days.

(21) Appl. No.: 10/281,754

(22) Filed: Oct. 28, 2002

(65) Prior Publication Data

US 2003/0232594 A1    Dec. 18, 2003

Related U.S. Application Data

(60) Provisional application No. 60/388,384, filed on Jun. 12, 2002.

(51) Int. Cl.
*H04Q 7/20* (2006.01)
*H04B 7/00* (2006.01)
*H04M 3/42* (2006.01)

(52) U.S. Cl. .................. 455/458; 455/518; 455/416
(58) Field of Classification Search ............... 455/517, 455/519, 521, 426.1, 416, 453, 432, 433.1, 455/445, 435.1, 458, 518; 370/466; 45/503
See application file for complete search history.

(56) References Cited

U.S. PATENT DOCUMENTS 6,229,621 B1    5/2001   Kulakowski et al.
6,360,076 B1 *  3/2002   Segura et al. ............ 455/67.11
6,400,942 B1    6/2002   Hansson et al.
6,731,944 B1 *  5/2004   Ostrup et al. ................ 455/458
6,839,565 B2 *  1/2005   Sarkkinen et al. .......... 455/503
6,909,880 B2 *  6/2005   Kojima et al. .............. 455/522
6,940,869 B1 *  9/2005   Wang et al. ................. 370/466
7,006,844 B2 *  2/2006   Sarkkinen et al. .......... 455/522
7,089,002 B2 *  8/2006   Wallentin .................... 455/434
2001/0027107 A1 * 10/2001 Shinozaki et al. .......... 455/456
2002/0071480 A1 *  6/2002  Marjelund et al. .......... 375/141
2002/0077087 A1 *  6/2002  Li ............................... 455/414
2002/0131428 A1 *  9/2002  Pecus et al. ................. 370/401
2003/0119533 A1 *  6/2003  Sarkkinen et al. .......... 455/500
2003/0223394 A1 * 12/2003  Parantainen et al. ........ 370/336

FOREIGN PATENT DOCUMENTS

RU    2242090    12/2004
RU    2257674    7/2005
RU    2259016    8/2005
RU    2262196    10/2005

OTHER PUBLICATIONS

Lin, Yi-Bing "A Multicast Mechanism for Mobile Networks", IEEE Communications Letters, vol. 5, No. 11, Nov. 2001.

* cited by examiner

*Primary Examiner*—Tilahun Gesesse
(74) *Attorney, Agent, or Firm*—Volpe and Koenig, P.C.

(57) ABSTRACT

A method is provided for delivery of Multimedia Broadcast and Multicast Service (MBMS) over wireless systems. The method optimizes the number of paging messages sent over the air interface in order to enhance the overall system capacity. MBMS active Mobile Station User Equipments (UEs) track their locations to the granularity of a cell based on information sent by the system.

16 Claims, 1 Drawing Sheet

METHOD AND APPARATUS FOR DELIVERING MULTIMEDIA MULTICAST SERVICES OVER WIRELESS COMMUNICATION SYSTEMS

CROSS REFERENCE TO RELATED APPLICATION

This application claims priority from U.S. Provisional Application No. 60/388,384, filed Jun. 12, 2002, which is incorporated by reference as if fully set forth.

FIELD OF THE INVENTION

The present invention relates to the field of wireless communications. More particularly, the present invention relates to multimedia/broadcast and multicasting services with wireless systems.

BACKGROUND OF THE INVENTION

The development of Multimedia Broadcast and Multicasting Service (MBMS) is facing some technical difficulties for the delivery of these services because of the mobility of the subscriber unit (UE). The UE initiates Multicasting services by activating the corresponding packet data protocol (PDP) context and receives the appropriate acknowledgements. Then the UE, if not active in one of the multicasting services, reverts to an "Idle" mode of operation. The UE while being in "Idle" mode may receive services (e.g., voice calls) by listening to its paging channel. The system usually does not track the UE movements within a certain coverage area location area (LA) or routing area (RA). Therefore, in order to locate the UE, the system has to page in multiple cells which comprises the LA or RA. Some proposals for the Multicast services use the paging mechanism to locate the user (UE) for the delivery of a Multicasting service. This prior art solution, while simple, leads to a significant increase in paging traffic.

SUMMARY

A simple alternative is to have the system serving general packet radio service support node (SGSN) assign a group identification number to be used with the association with particular MBMS multicast service. A group identity is used to page active subscribers instead of using the individual identification of the mobile station in the paging process. The use of Multicast group identification reduces the amount of paging traffic by a magnitude of the number of active subscribers using this particular MBMS multicast service.

In addition to using the multicast group identification, paging traffic is further minimized by using the proposed cell-tracking mechanism, which reduces the paging area into one cell thereby reducing the paging traffic by a magnitude of the number of cells comprising the LA/RA. The UE, while being active on multicast services and in "Idle state," monitors the cell changes. In case of any changes in the "Cell Identification" broadcast by the base station, the UE updates its current location (i.e., cell) enabling the system to avoid the necessity of paging the UE over multiple cells (LA/RA).

DETAILED DESCRIPTION OF THE DRAWINGS

The invention introduces a solution to the delivery of MBMS over wireless systems and optimizes the number of paging messages sent over the air interface, thereby enhancing the overall system capacity. The main features of the present invention are the use of a Group Identification number to distinguish wireless subscribers activating a particular MBMS multicast service and invoking, on an as-needed basis, the cell-location tracking mechanism in the UE. The cell-location location tracking mechanism allows active MBMS multicast subscribers to track their current location to the granularity of a cell, based on information sent by the system. The invocation of the cell tracking mechanism is accomplished in several ways (e.g., using a flag in the broadcast channel or using a flag in the MBMS activation response message).

Figure 1:
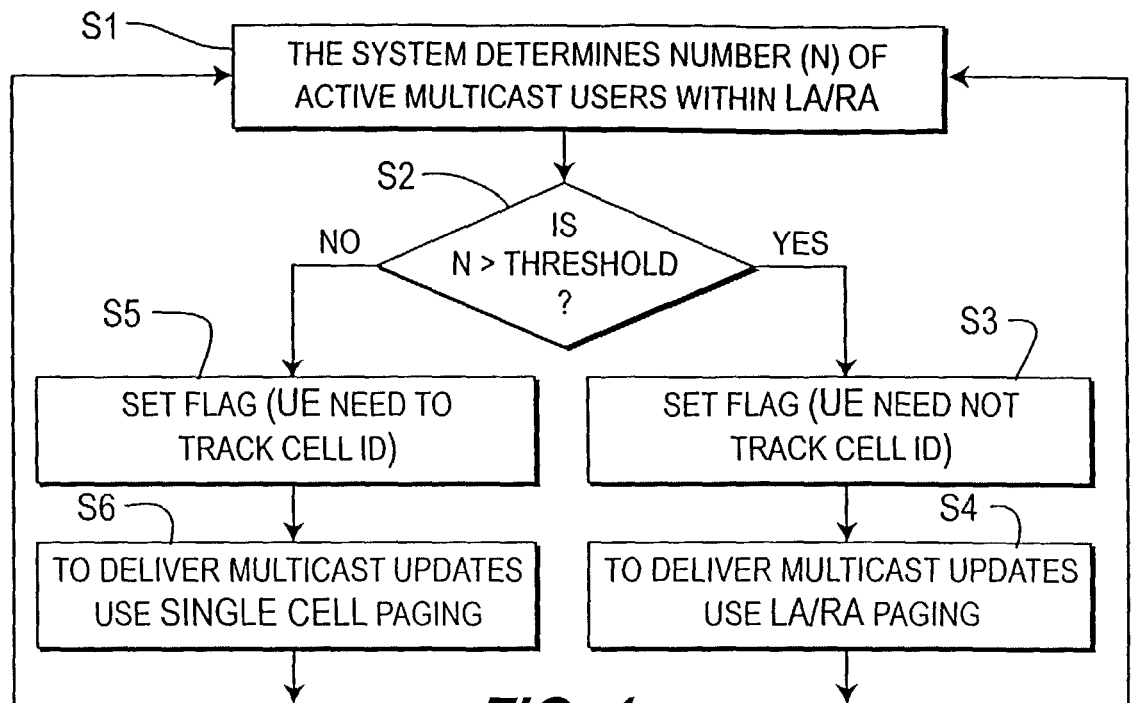
FIG. 1 is a flow chart describing the operating method of the present invention.

Making reference to FIG. 1, the system, at step S1 determines the number of active multicast users within the LA/RA. At step S2 the number N is compared against a given threshold. If the number of active multicast users is greater than the threshold, the routine branches to step S3, setting a flag (BB) that the UE need not track the cell identification number (ID). Thereafter, at step S4, the system delivers multicast updates using LA/RA paging. The program then cycles back to step S1 to monitor the number of active multicast users.

Returning to step S2, in the event that the number N of multicast users within LA/RA is less than the threshold, the routine branches and, at step S5, sets a flag to indicate that the UE is to track the cell ID. Thereafter, the program advances to step S6 where multicast updates are delivered using single cell paging. The program then returns to step S1 which functions in the manner previously described subsequent to return to step S1 from step S4.

Upon receiving an indication from the network to activate the cell tracking mechanism, a multicast subscriber UE who activates his services will monitor the Broadcast channel for a new Cell ID. If the UE detects any changes in the cell identification received over the broadcast channel, the UE starts location update procedures to update its cell location information in the universal terrestrial radio access (UTRAN) and the Supporting Node (SGSN) in the Core network. By tracking the most recent cell location within the LA/RA the system does not need to page the UE in the entire LA/RA for each new traffic for the multicast group.

The system merely needs to page the UE in the latest cell where the UE was reported present. The system uses a special Group Identification (ID) for paging the UE and others within the cell or LA/RA. This group identification is associated with the multicast service to which the UE is an active subscriber. The group identification (ID) is assigned to the UE upon activation of the service. The system, while triggering the cell-by-cell location update mechanism optimizes the number of cell location updates received on the access channel, i.e., the reduction in paging traffic should not negatively impact the overall system performance as a result of a dramatic increase in the number of location updates on the access channels. Therefore, the system tracks the number (N) of UEs engaged in multicast services within each LA/RA. If the number of active multicast UEs is smaller than a configurable threshold (T), the system activates the cell location tracking mechanism by setting the Cell Tracking Flag on the broadcast channel. If (N>T), the flag will remain unset, and the system pages the UE all over the LA/RA for each new multicasting traffic.

The objectives of the present invention are accomplished by having the UE track any changes in cell identification and invoking location update in association with multicast service activation. Then the system allocates a special group identification for paging multicast subscribers. In addition, the system tracks the number of active multicast services subscribers within the LA/RA. Moreover, there is provided a mechanism by which the system decides whether to invoke the cell location tracking mechanism or use the LA/RA paging mechanism to deliver multicast service notifications in the manner set forth in FIG. 1 and the accompanying description.

Figure 2:
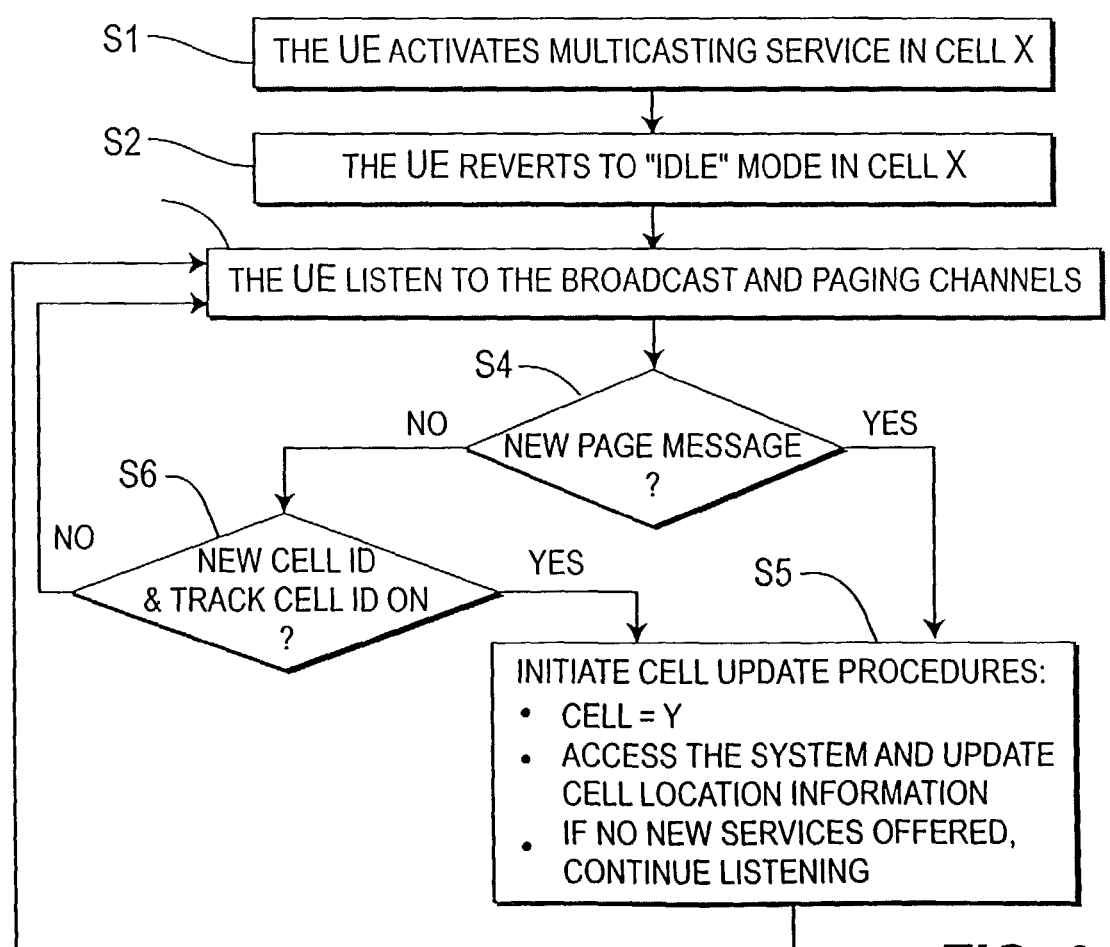
FIG. 2 is a flow chart further detailing the process of the present invention.

The operation at the UE as shown in FIG. 2 wherein, at step S1, the UE activates the multicasting service in a cell such as cell "X." Thereafter, at step S2, the UE reverts to the "Idle" mode in cell X. At step S3, the UE listens to the broadcast and paging channels and, at step S4, the UE makes the determination of whether a new page message is present. In the event that a new page message is present, the routine branches to step S5, at which time the UE initates cell update procedures which includes setting the cell ID to a given identifier (in the example given the identifier is denoted as Y), accessing the system and updating cell location information. If no new services are offered, the UE returns to step S3 to continue to listen to the broadcast and paging channels.

Returning to step S4, in the event that no new page message is present, the UE branches to step S6 and determines if a new cell identification number is present and a new track cell ID is on. If the answer is yes, the routine branches to step S5 to perform the operation as set forth above. In the event that there is no new cell ID and track cell ID on the routine branches to step S3 to continue listening to the broadcast and paging channels.

What is claimed is:

1. A method for delivery of multimedia broadcast and multicast service (MBMS) over a wireless system, comprising:
    a) detecting a number of subscriber units (UEs) present within a given region;
    b) comparing the number of UEs detected in step (a) with a given threshold;
    c) setting a flag that UEs need not track a cell identification number (ID) when the number of UEs obtained in step (a) is greater than said threshold; and
    d) delivering multicast updates to the UEs employing location area/routing area (LA/RA) paging.

2. The method of claim 1 wherein the system returns to step (a) after completion of step (d).

3. The method of claim 1 wherein the region is a location area/routing area (LA/RA).

4. A method for delivery of multimedia broadcast and multicast service (MBMS) over a wireless system, comprising:
    a) detecting a number of subscriber units (UEs) present within a given region;
    b) comparing the number of UEs detected in step (a) with a given threshold;
    c) setting a flag to track a cell identification number (ID) for the UE when the number of UEs obtained in step (a) is less than said threshold; and
    d) delivering multicast updates to the UEs employing single cell paging.

5. The method of claim 4 wherein the system returns to step (a) after completion of step (d).

6. The method of claim 4 wherein the region is a location area/routing area (LA/RA).

7. A method for use by a subscriber unit (UE) in a wireless system for providing updates to the system, comprising:
    a) the UE activating multicasting service in a given cell; and
    b) the UE while remaining in said given cell thereafter listening to broadcast and paging channels whereupon, responsive to a new page message in said given cell, the UE updates the cell ID, accesses the system and updates cell location information.

8. The method of claim 7 wherein the UE, upon activation of the multicasting service, reverts to an idle mode in said given cell.

9. The method of claim 7 wherein step (b) comprises returning to step (a) when no new message is present.

10. A method for use by a subscriber unit (UE) in a wireless system for providing updates to the system, comprising:
    a) the UE activating multicasting service in a given cell;
    b) the UE while remaining in said given cell thereafter listening to broadcast and paging channels whereupon when a new page message is present in said given cell, the UE updates the cell ID, accesses the system and updates cell location information; and
wherein, at step (b) the UE further identifies a new cell ID and track cell ID when no new message is present.

11. Apparatus for delivery of multimedia broadcast and multicast service (MBMS) over a wireless system comprising:
    means for detecting a number of subscriber units (UEs) present within a given region;
    means for comparing the number of UEs detected by said detecting means with a given threshold;
    means for setting a flag that UEs need not track a cell identification number (ID) when the number of UEs detected is greater than said threshold; and
    means for delivering multicast updates to the UEs employing AL/RA paging.

12. Apparatus for delivery of multimedia broadcast and multicast service (MBMS) over a wireless system, comprising:
    means for detecting a number of subscriber units (UEs) present within a given region;
    means for comparing the number of UEs detected by said detecting means with a given threshold;
    means for setting a flag to track a cell identification number (ID) for the UE when the number of UEs detected is less than said threshold; and
    means for delivering multicast updates to the UEs employing single cell paging.

13. Apparatus for use by subscriber units (UEs) in a wireless system for providing updates to the system, comprising:
    a UE having means for activating multicasting service in a given cell and
    means for thereafter listening to broadcast and paging channels while said UE is in said given cell, whereupon, responsive to a new page message in said given cell, the UE includes means to update cell ID, access the system and update cell location information.

14. The apparatus of claim 13 wherein the UE, upon activation of the multicasting service, includes means to revert to an idle mode in said given cell.

15. The apparatus of claim 13 wherein the means for listening comprises means for returning to the activating means when no new message is present.

16. Apparatus for use by subscriber units (UEs) in a wireless system for providing updates to the system, comprising:

a UE having means for activating multicasting service in a given cell and means for thereafter listening to broadcast and paging channels while said UE is in said given cell, whereupon when a new page message in said given cell is present, the UE includes means to update cell ID. accesses the system and update cell location information; and wherein the UE further includes means to identify a new cell ID and track cell ID when no new message is present.

* * * * *

UNITED STATES PATENT AND TRADEMARK OFFICE
CERTIFICATE OF CORRECTION

| | |
|---|---|
| PATENT NO. | : 7,239,880 B2 |
| APPLICATION NO. | : 10/281754 |
| DATED | : July 3, 2007 |
| INVENTOR(S) | : Kamel M. Shaheen |

Page 1 of 1

It is certified that error appears in the above-identified patent and that said Letters Patent is hereby corrected as shown below:

Column 2, line 14, after the words "cell-location", delete "location".

IN THE CLAIMS

Column 4, line 39, after the word "employing", delete "AL/RA", and insert therefor --LA/RA--.

Signed and Sealed this

Eighteenth Day of December, 2007

JON W. DUDAS
*Director of the United States Patent and Trademark Office*